Nov. 10, 1953 A. M. CLOGSTON ET AL 2,659,029
TUNABLE MAGNETRON CIRCUIT
Filed Nov. 16, 1945
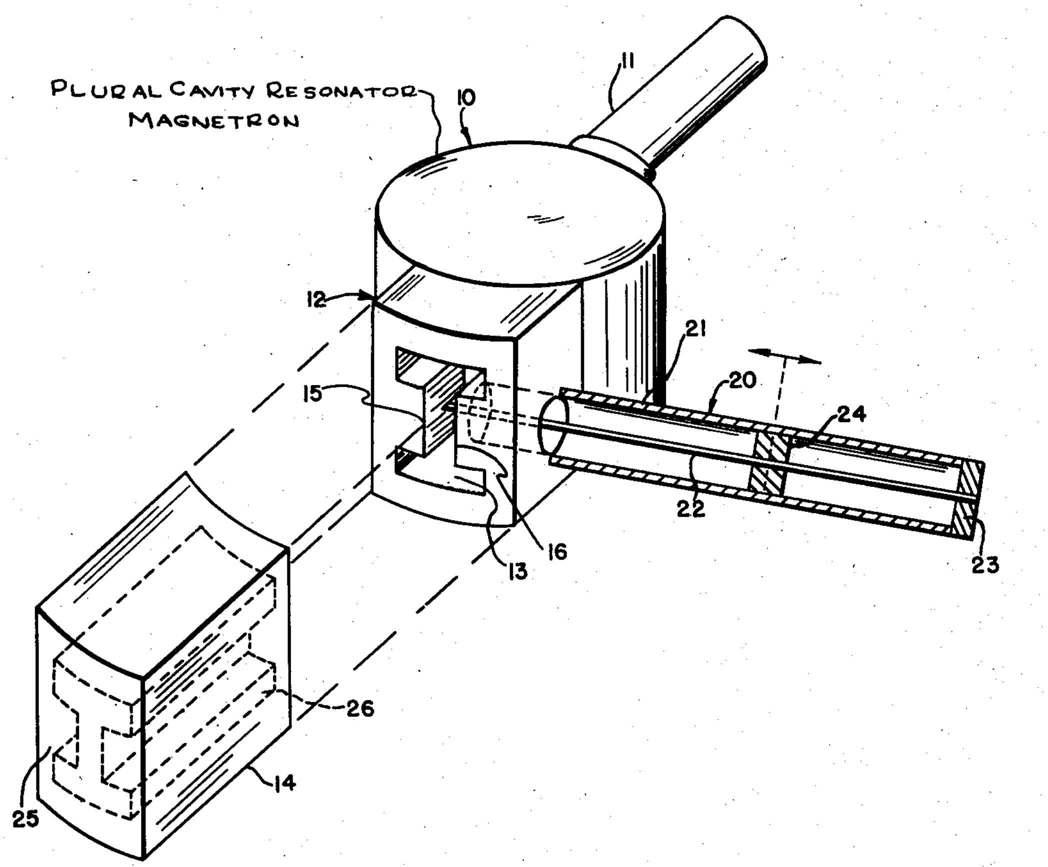
INVENTORS
ALBERT M. CLOGSTON
WILLIAM V. SMITH
BY
William D. Hall
ATTORNEY Patented Nov. 10, 1953 2,659,029

UNITED STATES PATENT OFFICE 2,659,029

TUNABLE MAGNETRON CIRCUIT

Albert M. Clogston, Melrose, and William V. Smith, Medford, Mass., assignors, by mesne assignments, to the United States of America as represented by the Secretary of War Application November 16, 1945, Serial No. 629,155

5 Claims. (Cl. 315—39)

This invention relates to electrical apparatus and more particularly to tunable magnetrons.

Various types of tunable magnetrons have been devised in the past. One common type has been the so-called "double output" magnetron. The double output magnetron has two R. F. channels, one being the customary R. F. output channel, the other being a tunable external reactance channel. Such double output magnetrons have in the past been characterized by relatively small tuning ranges (i. e. of the order of 3%).

An important object of the present invention is to produce a tunable magnetron having an extensive tuning range.

A further object of the invention is to minimize undesired modes of operation. In general, plural cavity magnetrons may operate in a variety of modes, each mode corresponding to a definite configuration of electric and magnetic fields for the various cavities within the plural cavity magnetron. The desired mode of operation is the high efficiency pi-mode. Other modes of oscillation are possible but are of lower efficiency than the desired pi-mode, and in general the appearance of these modes is to be prevented by proper design of the tube. The mode separation is the frequency difference betwen the desired pi-mode and the nearest undesired mode. The tuning range in general cannot exceed the mode separation for a particular magnetron.

Other objects and advantages of the invention will be apparent during the course of the following description.

In the accompanying drawing forming a part of this specification, the single figure is a simplified isometric view of a double output magnetron embodying the invention.

The tuning reactance channel is shown in cross-section, and the aperture terminating cavity is shown spaced from the magnetron to better illustrate the details of the coupling in the reactance channel.

Referring to the figure, numeral 10 designates a magnetron of the plural cavity type including several individual oscillator cavities (not shown). A standard R. F. output channel 11 couples into one of the oscillator cavities of magnetron 10. At a point substantially diametrically opposite the R. F. output 11, the coupling member 12 couples into another of the individual oscillator cavities of magnetron 10.

The coupling member 12 has a substantially I-shaped resonant aperture 13 cut in it. I-shaped aperture 13 opens on one side into one of the oscillator cavities of magnetron 10 and on the other side into an approximately quarter wavelength I-shaped cavity resonator 14. The I-shaped aperture 13 has two opposing surfaces 15 and 16 substantially parallel along the length of the I.

The reactance channel is a variable short-circuited coaxial transmission line tuning stub 20. The outer conductor 21 of tuning stub 20 is connected to surface 16 of the I-shaped aperture 13, while the inner conductor 22 continues across the gap between surfaces 15 and 16 and makes contact with surface 15. Thus tuning stub 20 is connected in parallel with the coupling aperture 13.

The inner conductor 22 of tuning stub 20 is supported by end plate 23. A movable shorting plunger 24 may be made to short-circuit tuning stub 20 at any desired point along the length thereof. The range of variation of electrical length of tuning stub 20 is substantially one-half wavelength.

The I-shaped cavity resonator 14 has been shown spaced from the coupling member 12 in order to illustrate the coupling details of the reactance channel. It is to be understood that the cavity resonator 14 is continuous with coupling member 12. The distance from the contact point of inner conductor 22 on surface 15 to the short-circuiting wall 25 (which terminates cavity resonator 14) is approximately a quarter wavelength (guide wavelength corresponding to the frequency used). Cavity resonator 14 has an I-shaped waveguide spaced 26 which forms substantially a quarter wavelength extension of the I-shaped aperture 13. Cavity resonator 14 is non-resonant at the frequencies used.

While cavity resonator 14 has been shown as a quarter wavelength extension of the I-shaped aperture 13, the cavity resonator 14 may be replaced by any cavity resonator which is non-resonant within the frequency range of the magnetron 10. The quarter wavelength shorted cavity resonator illustrated in the figure is merely one example of a cavity resonator non-resonant within the frequency range of magnetron 10.

Although not shown in the drawing, it is to be understood that conventional means are provided for making the structure described above airtight. Such means may comprise a glass-to-metal seal between the inner and outer conductors of line 11 near the junction of said line with magnetron 10 and another glass-to-metal seal between the inner and outer conductors 22, 21 of line 20 in the vicinity of member 12. There is an airtight seal between member 12 and magnetron 10 where the metal of member 12 joins the metal of the magnetron shell.

The operational features of the double output magnetron shown in the figure are as follows:

Magnetron 10 and R. F. output channel 11 constitute the customary magnetron. By coupling an external reactance into one of the cavity oscillators of magnetron 10, a "double output" or tunable magnetron is obtained. By attaching the coaxial transmission line tuning stub directly across the resonant aperture 13, an extremely high coefficient of coupling between the external reactance (i. e. tuning stub 20) and the magnetron 10 is made possible. Tuning ranges of the order of 15% are obtainable by this construction. In order to prevent loss of radiation through the coupling aperture 13, the coupling aperture 13 is terminated in a short-circuited cavity resonator (e. g. 14). This cavity resonator (e. g. 14), is constructed to be non-resonant within the frequency range of magnetron 10 in order not to interfere with the tuning effect of the variable tuning stub 20. The quarter wavelength shorted extension of aperture 13 is merely one embodiment of such a non-resonant terminated cavity resonator.

While there has been described what is at present considered to be a preferred embodiment of this invention, it will be obvious that various changes and modifications may be made therein without departing from the scope of the invention.

What is claimed is:

1. A tunable radio-frequency generator including a plural cavity magnetron, said magnetron having a plurality of individual cavity resonators formed therein, a radio frequency output coaxial transmission line coupled to one of said cavity resonators, coupling means having a substantially I-shaped aperture opening into a second of said cavity resonators substantially diametrically opposite said radio-frequency output line, said I-shaped aperture having two surfaces substantially parallel along the length thereof, a coaxial transmission line tuning slug connected across said two surfaces, the inner conductor of said tuning stub making contact with one of said surfaces and the outer conductor of said tuning stub making contact with the other of said surfaces, a shorting plunger contained within said tuning stub and adapted to short-circuit said tuning stub at intermediate points along the length thereof, and an I-shaped cavity resonator aligned with the said I-shaped aperture and forming a continuation thereof, said I-shaped resonator extending from said aperture for a distance of approximately a quarter of one wavelength of the frequency of said magnetron, whereby the adjustment of said shorting plunger will vary the reactance of said tuning stub, thereby changing the frequency of said magnetron.

2. A tunable radio frequency generator including a plural cavity magnetron, said magnetron having a plurality of individual cavity resonators, a radio frequency output transmission line coupled to one of said cavity resonators, an additional cavity resonator non-resonant in the frequency range of said magnetron, said additional resonator having a substantially I-shaped aperture serving to couple said additional resonator to a second of said individual cavity resonators, and a variable short circuited coaxial transmission line tuning stub connected across said aperture.

3. A tunable radio frequency oscillator including a magnetron, a radio frequency output transmission line coupled to said magnetron, a cavity resonator non-resonant within the frequency range of said magnetron, said resonator having a resonant aperture coupling said resonator to said magnetron, and a variable short-circuited tuning stub connected across said aperture.

4. A tunable radio-frequency oscillator including a magnetron, a radio frequency output transmission line coupled to said magnetron, a cavity resonator non-resonant within the frequency range of said magnetron, said resonator having a resonant aperture directly coupling said resonator to said magnetron and a variable tuning reactance connected across said aperture.

5. A variable frequency radio frequency generator including a radio-frequency oscillator having a given frequency range, a radio frequency output transmission line coupled to said oscillator, a cavity resonator non-resonant within said frequency range of said oscillator, means for coupling said resonator to said oscillator and a variable tuning reactance connected in parallel with said coupling means for varying over a substantial range of frequencies the output of said radio frequency oscillator.

ALBERT M. CLOGSTON.
WILLIAM V. SMITH.

References Cited in the file of this patent

UNITED STATES PATENTS

| Number | Name | Date |
|---|---|---|
| 2,233,482 | Linder | Mar. 4, 1941 |
| 2,356,414 | Linder | Aug. 22, 1944 |
| 2,373,233 | Dow et al. | Apr. 10, 1945 |
| 2,406,402 | Ring | Aug. 27, 1946 |
| 2,411,151 | Fisk | Nov. 19, 1946 |
| 2,501,052 | Herlin | Mar. 21, 1950 |
| 2,523,286 | Fiske et al. | Sept. 26, 1950 |